US010214621B2

(12) United States Patent
Potter et al.

(10) Patent No.: US 10,214,621 B2
(45) Date of Patent: Feb. 26, 2019

(54) BINARY PROCESS FOR MANUFACTURE OF DIPPED LATEX PRODUCTS

(71) Applicant: TTK Healthcare Limited, Chennai (IN)

(72) Inventors: William D. Potter, Cambridge (GB); N. Balasubramanian, Chennai (IN); Srinivasan Jagannathan, Chennai (IN)

(73) Assignee: TTK Healthcare Limited, Chennai (IN)

( * ) Notice: Subject to any disclaimer, the term of this patent is extended or adjusted under 35 U.S.C. 154(b) by 163 days.

(21) Appl. No.: 14/902,124

(22) PCT Filed: Jan. 17, 2014

(86) PCT No.: PCT/IN2014/000035
§ 371 (c)(1),
(2) Date: Dec. 30, 2015

(87) PCT Pub. No.: WO2015/004674
PCT Pub. Date: Jan. 15, 2015

(65) Prior Publication Data
US 2016/0145401 A1    May 26, 2016

(30) Foreign Application Priority Data
Jul. 10, 2013    (IN) .......................... 3083/CHE/2013

(51) Int. Cl.
*C08J 5/02*       (2006.01)
*C23C 2/26*       (2006.01)
*C08L 7/02*       (2006.01)

(52) U.S. Cl.
CPC . *C08J 5/02* (2013.01); *C08L 7/02* (2013.01); *C23C 2/26* (2013.01); *C08J 2307/02* (2013.01); *C08J 2309/10* (2013.01)

(58) Field of Classification Search
CPC .......... A61F 6/04; A41D 19/0055; C08J 5/02
USPC ....................................................... 427/413
See application file for complete search history.

(56) References Cited

U.S. PATENT DOCUMENTS

| 2,230,138 | A | * | 1/1941 | Ewart | B29D 22/02 |
| | | | | | 2/168 |
| 2,373,375 | A | * | 4/1945 | Blake | C08K 5/38 |
| | | | | | 524/280 |
| 3,933,723 | A | * | 1/1976 | Grenness | C08J 3/092 |
| | | | | | 427/430.1 |
| 5,132,129 | A | * | 7/1992 | Potter | C08G 18/10 |
| | | | | | 427/2.3 |
| 6,051,320 | A | * | 4/2000 | Noecker | C08J 5/02 |
| | | | | | 2/161.7 |
| 6,306,514 | B1 | * | 10/2001 | Weikel | A61L 31/10 |
| | | | | | 264/211.24 |
| 6,920,643 | B2 | * | 7/2005 | McGlothlin | C08J 5/02 |
| | | | | | 2/168 |
| 7,374,711 | B2 | * | 5/2008 | McGlothlin | B29C 41/14 |
| | | | | | 264/236 |
| 9,821,092 | B2 | * | 11/2017 | Bengtson | A61L 31/10 |
| 2005/0065249 | A1 | * | 3/2005 | Dzikowicz | C08K 5/0025 |
| | | | | | 524/213 |
| 2006/0010565 | A1 | * | 1/2006 | Teoh | B29C 41/003 |
| | | | | | 2/168 |
| 2006/0150300 | A1 | * | 7/2006 | Hassan | A41D 19/0058 |
| | | | | | 2/161.6 |
| 2008/0051498 | A1 | * | 2/2008 | Kodama | B29C 41/14 |
| | | | | | 524/394 |
| 2008/0139723 | A1 | * | 6/2008 | Foo | A41D 19/0058 |
| | | | | | 524/418 |
| 2016/0160069 | A1 | * | 6/2016 | Chen | B29C 41/14 |
| | | | | | 428/493 |

FOREIGN PATENT DOCUMENTS

| RU | 2103170 C1 | 1/1998 |
| WO | 99/20203 A2 | 4/1999 |
| WO | 2007/113463 A1 | 10/2007 |

OTHER PUBLICATIONS

International Search Report dated Aug. 12, 2014 from corresponding International Application No. PCT/IN2014/000035; 4 pgs.

* cited by examiner

*Primary Examiner* — Cachet I Sellman
(74) *Attorney, Agent, or Firm* — Maier & Maier, PLLC

(57) ABSTRACT

A binary process for manufacturing dipped latex product. The binary process disclosed herein eliminates the influence of any level of pre-vulcanization on the outcome of the dipping process whether using natural or synthetic latex. The binary process includes preparing a first latex mixture Formulation A including latex, one or more accelerators, and one or more surfactants, but without curing agents; and preparing a second latex mixture Formulation B including latex, one or more curing agents, and one or more surfactants, but without curing accelerators. The process further includes dipping one or more formers into the Formulations A and B separately in order to form a plurality of coatings/layers of the Formulations A and B, and later on curing the plurality of coatings/layers on the formers to form the dipped latex products, which can be a condom, glove, balloon, catheter, finger cot, surgical tubing, baby bottle nipple or dental dam.

12 Claims, No Drawings

BINARY PROCESS FOR MANUFACTURE OF DIPPED LATEX PRODUCTS

FIELD OF THE INVENTION

The present invention relates to the field of manufacturing latex products. More particularly the present invention relates to a method of manufacturing latex products through binary process using Rubber Lattices such as Natural Rubber Latex including *Hevea brasiliensis* and Guayule latex and Synthetic Rubber Lattices including Nitrile, Polychloroprene and Polyisoprene.

BACKGROUND OF THE INVENTION

Dipped latex products such as gloves, condoms, balloons and finger cots are made by well-established manufacturing process where the curing agent typically sulphur, accelerators, activators, surfactants are added to one or more of the lattices, namely: Natural Rubber Lattices including *Hevea brasiliensis* and Guayule latex and Synthetic Rubber Lattices including Nitrile, Polychloroprene and Synthetic Polyisoprene to prepare a liquid compound used in the dipping process. Dipping is a process where formers, which are articles having the shape of the required finished articles such as gloves, condoms, balloons, etc., are dipped into a liquid compound of the selected latex. When the formers are withdrawn from the compounded latex, a thin film of the latex compound remains coated on the formers. Then the film is dried and heated to cure the polymer to form the dipped article.

Often successive layers are applied by carrying out repeated dipping of the coated formers into latex compound again and then drying the film. The process is repeated on the dried film to improve physical properties of the finished product and/or add colour to the film. Two or more repetitions of dipping is carried out depending upon the nature of Formulation of compound, intended level of thickness and physical properties, colour addition to the coating of the film etc. When the drying and curing processes are completed the coated film is removed from the former in the shape of the required article. In large scale manufacturing, the dipping process is automated so that a number of formers are mounted on an endless conveyor chain that carries the formers through stages of immersion into latex compound (termed dipping) followed by drying in heated ovens and eventually removal of article from the formers.

In conventional continuous dipping processes, all the compounding ingredients and curing agents, typically sulphur, accelerators, activators, and surfactants, are added to lattices in the manufacturing stage called compounding. As per the state of the art, all the compounding ingredients must be mixed homogenously in the lattices to produce the dipped articles with good physical properties.

The majority of the dipped latex products manufacturers use the dipping process broadly described above. The overall machinery inclusive of latex compound storing vessels and related automation to carry out the dipping process is called a dipping plant. The latex holding vessels in which the latex compound is held to enable formers to be dipped are called dippers or dipping tanks. These dippers have built-in cooling provisions to maintain latex temperature within pre-determined range. Depending upon plant design and process requirements the plant would have two or more dippers and associated drying ovens. For example, if two coatings of latex compound are to be made on the former then there could be two different dippers. In some designs the same formers are repeatedly immersed into the dippers twice. This is achieved by routing the formers carried by endless conveyor chain twice into the same dipper. Many variations on multiple dips are in use in the industry.

Condoms, which are manufactured from the rubber lattices by employing dipping process, are commonly used during sexual intercourse to reduce the probability of pregnancy and/or prevent spreading sexually transmitted diseases. Traditionally condoms have been made from natural rubber latex but more recently condoms made from various synthetic elastomers have been introduced. In particular, condoms made from synthetically prepared polyisoprene have been found to offer a number of advantages over traditional condoms.

The synthetically prepared polyisoprene serves as a suitable substitute of natural latex for manufacturing condoms. However, the synthetic polyisoprene is known to cure very fast. This pre-disposes manufacturing process to be designed such that the cure rate is kept well controlled until conversion into condoms by dipping process. The fast curing is managed through lowering the temperature of the latex in the plant. As compared to natural rubber latex where the compound is maintained at about 25° C. the synthetic latex needs to be maintained at 15° C. Therefore, while manufacturing dipped latex articles from the synthetic lattices the temperature is required to be maintained at 15° C. so that reduction in the rate of curing (in this case pre-vulcanisation) can be achieved.

One of the methods disclosed in Patent publication WO2007113463 requires the latex to be stored and used in low temperature preferably at 15° C. or less to slow down curing. This process of cooling is expensive.

In another method of preventing the fast cure is disclosed in Patent publication U.S. Ser. No. 10/085,890. That patent requires the use of unusual compounding ingredients some of which are considered toxic.

For the purpose of preparing dipped latex products both natural latex and synthetic latex are used. Both types of lattices have inherent disadvantages due to pre-vulcanization. Therefore, there exists a need for a process that can eliminate the influence of any level of pre-vulcanization on the outcome of the dipping process and facilitate manufacturing of dipped latex products from the latex unencumbered from its inherent disadvantages.

SUMMARY OF THE INVENTION

The present invention provides a binary process for manufacturing dipped latex product. The binary process includes preparing a first latex mixture Formulation A comprising latex, one or accelerators, and one or more surfactants, and preparing a second latex mixture Formulation B comprising latex, one or more curing agents, and one or more surfactants. Further, dipping one or more formers into the Formulation A and B separately in order to form a plurality of coatings/layers of the Formulation A and B, and later on curing the plurality of coatings/layers on the formers to form the dipped latex products.

DETAILED DESCRIPTION OF THE INVENTION

The present invention provides a binary process for manufacturing of dipped latex products. The disclosed binary process is advantageous; both in cases of using synthetic and natural lattices for manufacturing of dipped latex products. It is particularly advantageous when used for manufacturing from fast curing synthetic lattices such as, but not limited to, nitrile, polychloroprene and synthetic polyisoprene. The present invention overcomes the disadvantages inherent in the use of synthetic rubber lattices, which are namely fast curing rate and requirement of maintaining low temperature at 15° C. or less to overcome the problem of fast curing rate.

The present invention provides for the binary process for manufacturing dipped latex products including following steps:

1) Preparing two separate mixtures of the latex in two different dippers each held at a temperature of 24° C. to 30° C., wherein the first mixture is designated as Formulation A including the latex and an accelerator, such as, but not limited to, zinc dibutyl dithiocarbamate and other surfactants and the second mixture is designated as Formulation B including the latex and curing agents, such as, but not limited to, sulphur and other surfactants. However sulphur donors such as thiuram sulphides and dithiomorpholine can also be used. Significant pre-vulcanization does not occur as the ingredients needed for the reactions are not together in the same compound, as the Formulations A and B are kept in separate dippers. The requirement of maintaining low temperature is also eliminated since there is no mixing of accelerators with curing agents at this stage. Utmost care is taken that the accelerators with curing agents do not come into contact with each other until intended to do so.

2) As against the established practice of dipping formers in a latex compound with both the accelerator and curing agent present together, this invention envisages coating formers initially with the Formulation A including the accelerator compound only in the first dip by immersing them to a depth sufficient to yield the finished latex product of desired length. The first coating is then partially dried on the formers. The formers, already coated with Formulation A, are then dipped into the Formulation B including the curing agent compound in the second dip. The second coating is then dried. The formers are then heated to appropriately initiate vulcanization of the two layers to form cross linking. Hence, the name "Binary Process". The process of vulcanization initiates automatically once the accelerator and curing agent compounds come in contact with each other. Subsequent heating of the film formed on the formers by the two coats at 60° C. to 120° C. in the ovens accelerates the process of vulcanization and cross linking takes place to form the cured film. The dipping process is adjusted to achieve the desired thickness and length as per the dipped latex product to be manufactured.

3) Subsequent steps in the manufacturing process such as exposure to vulcanizing ovens, leaching, stripping of product from the formers etc., are similar to those employed in the normal manufacture of dipped latex products.

There can be various sequences of dipping the formers in the Formulation A and B. In one embodiment, the formers are first dipped into the Formulation A having accelerator compound, preferably kept at 24° C. to 30° C. The first dipping stage forms a thin coating of the Formulation A containing the accelerator compound on the former. This accelerator coating is dried in a hot oven. The coating remains as a dry film on the formers while the formers are dipped into the Formulation B containing the curing agents, preferably kept at 24° C. to 30° C. in the next dipper. While coming out of the second dipper the formers have an over-coating of the curing agent compound on the previously made accelerator coating. Further, the coatings so formed are dried and vulcanized by heating.

In another embodiment, the coat formed over the formers dipped in the Formulation A is not allowed to dry completely and the formers are dipped into the Formulation B to form another coat and then the coatings so formed are dried and vulcanized by heating.

In yet another embodiment, three sequential dips are allowed. In this a sandwich of curing compound film made by the Formulation B between two accelerator compound films made by the Formulation A is created. The formers are first dipped into the Formulation A having accelerator compound to form a thin coating of the Formulation A on the formers and the accelerator coating is dried in a hot oven. The said formers having dry film of latex formed by Formulation A is again dipped in the Formulation B to form a thin over coating of Formulation B, which is then dried in the hot oven. Further, the said formers, having dried film formed by coatings of Formulation A and B, are again dipped in the Formulation A to form a thin over coating of the Formulation A. Thereafter, all the coatings are dried in the hot oven and curing is performed.

In a further embodiment, three sequential dips are allowed with alterations in drying pattern of the coats formed by Formulation A and B. In this a sandwich of curing compound film made by the Formulation B between two accelerator compound films made by the Formulation A is created. The formers are first dipped into the Formulation A having accelerator compound to form a thin coating of the Formulation A on the formers and the accelerator coating is dried in a hot oven. The said formers having dry film of latex formed by Formulation A is again dipped in the Formulation B to form a thin over coating of Formulation B, which are then are again dipped in the Formulation A to form a thin over coating of the Formulation A without drying the coating formed by Formulation B. Thereafter, all the coatings are dried in the hot oven and curing is performed.

In the process disclosed by the present invention, no appreciable curing occurs until the two mixtures (Formulations A and B) come together in film formation. There is no need to maintain low temperature at 15 ° C. or less either at the compound preparation stage or in the dippers in the plant. As a result, the individual compounds of synthetic polyisoprene are not temperature sensitive although it is preferred that temperatures are maintained at 24° C. to 30° C., similar to that of the natural rubber latex compound. This temperature range is maintained to keep physical properties such as viscosity, thickness of coating etc. under control. The disclosed process keeps the crucial reactants—the curing agent and the accelerator separate and bring them together only when needed, thus overcoming the disadvantage of fast curing rate and the maintenance of low temperature.

The products manufactured by the disclosed process have physical properties similar to that of the products made from lattices mixed with curing agent and accelerator stored at low temperature through conventional method.

In the case of using natural rubber latex to manufacture dipped latex products, the binary process significantly improves the degree of control over the state of any pre-vulcanization of the latex at the time of dipping. This means that products have more reproducible properties and there is less lot-to-lot variability. The process can also be used to dip with a lower degree of pre-vulcanization. This improves film integration leading to improved properties and improved product reproducibility.

The binary process disclosed in the present invention is useful in manufacturing variety of dipped latex products including, but not limited to, medical gloves, condoms, balloons, male external urinary drainage catheters, surgical tubing, contraceptive diaphragms, finger cots, catheter balloons and cuffs, uterine thermal ablation balloons, drug infusion bladders, tissue retrieval pouches, medical tubing, baby bottle nipples, infant pacifiers, anesthesia breather bags, resuscitation bags, rubber dental dams, and exercise bands. The invention can be applied to any latex material used for making dipped products.

A key advantage of dipped articles produced from synthetic latex is the absence of natural rubber latex proteins that can lead to Type I allergic reactions. If both natural rubber latex and synthetic rubber latex products are made in same plant it is essential while switching between the lattices to use cleaning measures to prevent cross-contamination of the synthetic latex products with natural latex and its components. All equipment should be thoroughly cleaned before preparation of dispersions and solutions. Ensure that the cleaning removes all residues/traces of any natural latex and related proteins. While handling synthetic latex plant operators and technicians should wear nitrile rubber gloves throughout manufacture.

The present invention is explained further in the following specific examples which are only by way of illustration and are not to be construed as limiting the scope of the invention.

The following examples illustrate the application of the invention for manufacturing condoms from synthetic latex and natural latex. These examples show different types of forming the film coating and drying as well as using different types of lattices while maintaining the Binary Process.

EXAMPLES

Example 1

Using Synthetic Polyisoprene Latex

Step A: Preparation of Dispersions and Solutions

The compounding ingredients were added to the latex in the form of dispersions in water. Standard procedures that are well established in the art can be used for the preparation of these dispersions. The solutions were prepared as follows:
0.01% KHWS solution (potassium hydroxide in water solution),
20% Emulgin® B2 solution (surfactant—Cetyl stearyl alcohol etherified with 20 mol Ethylene Oxide),
10% Potassium oleate solution,
15% Anilan solution (surfactant—a dodecyl benzene sulphonate), and
5% KOH solution.
Similarly the following dispersions were prepared:
20% Composite paste containing ZDBC (zinc dibutyl dithiocarbamate), ZnO (zinc oxide)and anionic dispersing agent such as Darvan® SMO (Sodium Salts of Sulfated Methyl Oleate)/Darvan® 1SD (Sodium salt of condensed sulfonated naphthalene),
50% Sulphur paste containing Sulphur, Darvan® 1SD/ SMO, and
40% Struktol® LA229 dispersion (Butylated reaction product of p-cresol and dicyclopentadiene).
The pH of the above dispersions were adjusted to be >11.5 by adding 10% KOH solution if necessary.

Step B: Compounding of Synthetic Latex

The synthetic polyisoprene latex is used in this example. A key element of the invention is the preparation of two separate mixtures, one designated as "Formulation A" containing synthetic latex and accelerator mixture and the other designated as "Formulation B" containing synthetic latex and curing agents' mixture.

These compounds are usual Formulation using quantities which were worked out based on the phr values (parts per hundred of rubber) as given below in Tables 1 and 2.

Although in the individual Formulations A and B, the quantities of curing agents and accelerator agents appear to be about twice the normal amounts used in conventional latex dipping. It is to be noted that in the final composition of the dipped product, e.g. a condom, the quantities of curing agents and accelerator is the same as those used normally in conventional dipping processes. This is due to the fact that Formula A contains ×2 accelerator but zero sulphur and Formula B contains ×2 Sulphur but zero accelerator. When added together in terms of total composition the ingredients balance out as ×1.

Before startup of compounding activities all vessels and equipment used in this process were confirmed to be free from contamination and clean.

(1) Preparation of Synthetic Latex Formulation A (a) Addition of Solutions to the Synthetic Latex The required quantity of synthetic latex (Kraton® IR 401) was transferred into a compounding vessel (designated for "Formulation A") using a designated pump. During transfer the latex was filtered through 40 micron filter.

The latex was stirred using a mechanical stirrer with a speed of rotation within the range of 30 to 60 rpm. The temperature of the compounded latex was maintained within (27±3)° C. throughout this process until the compounded latex was transferred to the Dipping Line.

The quantities of ingredients added to the latex are given in Table 1.

TABLE 1

| Quantity of solutions and dispersions of Formulation A | | |
|---|---|---|
| Primary chemicals | % TSC | phr |
| Kraton ® IR 401 | 65 | 100 |
| Emulgin ® B2 | 20 | 0.4 |
| Potassium oleate | 10 | 0.33 |
| Anilan NC 30 | 15 | 0.1 |
| KOH | 5 | 0.1 |
| KHWS | 0.01 | NA |
| Composite paste | 30.96 | 1.84 |
| 0.01 KHWS solution | 0.01 | 0.0004 |
| Darvan ® SMO/Darvan 1SD | 100 | 0.019 |
| ZDBC | 100 | 1.59 |
| ZnO | 100 | 0.231 |
| Struktol ® LA 229 | 40 | 1 |

The addition of solutions to latex was performed in the following manner:

The required quantity of the 20% Emulgin® B2 solution was weighed into a SS (stainless steel) container. The pH of the solution was adjusted to a range between 11.5 to 12.5 by adding 10% KOH solution as needed. The Emulgin®B2 solution was then added to the Kraton® IR-401 latex at a slow rate over 15 minutes. The SS container was then rinsed with 0.01% of KHWS solution which was then added to Kraton IR-401 latex. The latex was then allowed to mix for 15 minutes.

The required quantity of 10% potassium oleate was weighed into an SS container and added to the Kraton IR-401 latex at a slow rate over 15 minutes. The SS container was rinsed with 0.01% of KHWS solution which was then added to Kraton® IR-401 latex. The latex was then allowed to mix for a duration of 45 minutes.

The required quantity of the 15% Anilan solution was weighed into the SS container and added to the Kraton® IR-401 latex at a slow rate over 15 minutes. The SS container was rinsed with the 0.01% of KHWS solution which was then added to the Kraton® IR-401 latex. The latex was then allowed to mix for 15 minutes.

The required quantity of the 5% Potassium Hydroxide solution was weighed into the SS container and then added to the Kraton® IR-401 latex at a slow rate over 15 minutes. The SS container was rinsed with the 0.01% of KHWS solution which was added to the Kraton IR-401 latex.

After addition of these 4 solutions the latex was stirred for 1 hour using a mechanical stirrer before adding the dispersions as explained below.

(b) Addition of Dispersions to Synthetic Latex

The required quantity of the 20% Composite paste was weighed into a SS container. Composite paste was well mixed and homogenized before use. The pH of the paste was adjusted to a range between 11.5 to 12.5 by adding the 10% of KOH solution as needed. The composite paste was then added to the Kraton® IR-401 latex at slow rate over 15 minutes. The SS container was rinsed with the 0.01% of KHWS solution which was then added to Kraton® IR-401 latex. The latex was then allowed to mix for a duration of 15 minutes.

The required quantity of the 40% Struktol® LA229 was weighed into a SS container. The pH of the paste was adjusted to a range between 11.5 and 12.5 by adding the 10% of KOH solution as needed. The paste was then added to the Kraton® IR-401 latex at a slow rate over 15 minutes under mixing. The lid of the compounding tank was then closed. The compounded latex was continually stirred for a duration of 24 hours and afterwards kept without agitation for further duration of 24 hours.

The properties of the compounded latex such as total solids content, total alkalinity, pH, and viscosity were measured.

The Formulation A was then transferred to the Dipping Line.

(2) Preparation of Synthetic Latex Formulation B
(a) Addition of Solutions to Synthetic Latex The required quantity of synthetic latex (Kraton® IR 401) was transferred into a compounding vessel (designated for "Formulation B") using a designated pump. During transfer the latex was filtered through 40 micron filter.

The latex was stirred using a mechanical stirrer with a speed of rotation within the range of 30 to 60 rpm. The temperature of the compounded latex was maintained within (27±3)° C. throughout this process until the compounded latex was transferred to the Dipping Line.

The quantities of ingredients added to the latex are given in Table 2.

TABLE 2

Quantity of solutions and dispersions of Formulation B

| Primary chemicals | % TSC | phr |
|---|---|---|
| Kraton ® IR 401 | 65 | 100 |
| Emulgin ® B2 | 20 | 0.4 |
| Potassium oleate | 10 | 0.33 |
| Anilan NC 30 | 15 | 0.1 |
| KOH | 5 | 0.1 |
| KHWS | 0.01 | NA |
| Sulphur paste | 68.07 | 1.64 |

TABLE 2-continued

Quantity of solutions and dispersions of Formulation B

| Primary chemicals | % TSC | phr |
|---|---|---|
| Sulphur paste-sub-components: | | |
| 0.01% KHWS soln | 0.01 | 0.00008 |
| Darvan ® SMO/Darvan ® 1SD | 100 | 0.01 |
| Bentonite clay | 100 | 0.01 |
| Sulphur | 100 | 1.62 |
| Struktol ® LA 229 | 40 | 1 |

The addition of solutions to the latex was performed in the following manner: The required quantity of the 20% Emulgin® B2 was weighed into a SS container. The pH of the solution was adjusted to a range between 11.5 to 12.5 by adding the 10% of KOH solution as needed. The solution was then added to the Kraton® IR-401 latex at a slow rate over 15 minutes. The SS container was rinsed with the 0.01% of KHWS solution which was then added to the Kraton® IR—401. The latex was then allowed to mix for a duration of 15 minutes.

The required quantity of the 10% potassium Oleate was weighed into the SS container and then added to the Kraton® IR-401 latex at a slow rate over 15 minutes. The SS container was rinsed with the 0.01% of KHWS solution which was then added to the Kraton® IR-401 latex. The latex was then allowed to mix for a duration of 45 minutes.

The required quantity of the 15% Anilan solution was weighed into the SS container and added to the Kraton® IR-401 latex at a slow rate over 15 minutes. The SS container was rinsed with the 0.01% of KHWS solution which was then added to the Kraton® IR-401 latex. The latex was then allowed to mix for a duration of 15 minutes.

The required quantity of the 5% Potassium Hydroxide solution was weighed into the SS container and added to the Kraton® IR-401 latex at a slow rate over 15 minutes. The SS container was sensed with the 0.01% of KHWS solution which was then added to Kraton® IR-401 latex.

After addition of these 4 solutions of the latex was stirred for 1 hour before adding the dispersions.

(b) Addition of Dispersions to the Synthetic Latex

The required quantity of the 50% sulphur paste dispersion was weighed into a SS container. The sulphur paste dispersion was well mixed and homogenized before use. The pH of the paste was adjusted to between 11.5 to 12.5 by adding the 10% of KOH solution as needed. The sulphur pasted then added to the Kraton® IR-401 latex at a slow rate over 15 minutes. The SS container was rinsed with the 0.01% of KHWS solution which was then added to Kraton® IR-401 latex. The latex was then allowed to mix for a duration of 15 minutes. The required quantity of the 40% Struktol® LA229 was weighed into the SS container. The pH of the dispersion was adjusted to between 11.5 to 12.5 by adding the 10% of KOH solution as needed. The dispersion was then added to the Kraton® IR-401 latex at a slow rate for over 15 minutes under mixing. The lid of the compounding tank containing the Formulation B was then closed. The compounded latex, after addition of all the dispersions, was continually stirred for about 24 hours and then kept it without agitation for a further 24 hours.

The properties of the compounded latex such as total solids content, total alkalinity, pH, and viscosity were measured.

The Formulation B was then transferred to the Dipping Line.

Step C: Condom Dipping Process

The cleanliness of dipping tanks, leach tanks, cleaning brushes, product collection apparatus etc., was all checked before dipping commenced.

The compounded Formulation A from the compounding tank 1 and the compounded Formulation B from the compounding tank 2 were transferred to dipping tank 1 and dipping tank 2 respectively 3-6 hours before use to allow air bubbles to vent out from the latex compound.

The temperature of the compounds in the dipping vessels and their respective reserve tanks was maintained within $(27\pm3)°$ C. throughout the Dipping Process. This temperature regulation is needed to maintain physical properties such as viscosity, total solids content etc. and to minimize loss of water due to evaporation and is not critical to control vulcanization/pre-vulcanisation. As such no significant vulcanization/pre-vulcanisation takes place at this stage.

Dipping was carried out using the above compounds independently, the Formulation A in the first dipper and Formulation B in the second dipper. The dippers were distinctly separated from each other to prevent cross contamination. Dipping was performed as per previously established methods for making condoms using conventional dipping processes. The films of latex compound coated on the formers were dried by means of electrical heaters set to achieve film temperatures of 60° C. to 120° C. The accelerator compound (Formulation A) coating had an over coating of sulphur compound (Formulation B) and vulcanization was initiated at this stage. The dried film was immersed in 1% slurry of composite paste with accelerator in the third dip to prevent surface stickiness. The condoms were collected in wet slurry for further processing. The condoms will then be removed from the formers and will undergo washing and drying processes, called post-treatment, in the same way as conventionally manufactured condoms.

In a typical post-treatment process condoms are collected every hour from the formers, washed in slurry and dried by means of air-heating. At this stage, further vulcanizing occurs giving the condoms necessary strength. The strength of the condoms can be measured by the established air inflation test where the condoms are inflated with air until they burst. The volume of air inflated and the pressure achieved at the point of bursting are indicators of how good the film/condom is and the consistency of the process of manufacturing.

The results obtained for condoms manufactured by the disclosed binary method were found to be comparable to those for condoms made by the previously established process where the latex compound, containing both accelerators and curing agents, is cooled to about 15° C.

Example 2

Using Synthetic Polyisoprene Latex

Different Method of Dipping

Step A: Preparation of Dispersions and Solutions and Step B: Compounding of Synthetic Latex will be same as in Example 1
Step C: Condom Dipping Process In this example the Dipping was carried out using the above compounds independently, the Formulation A in the first dipper and Formulation B in the second dipper. The dippers were distinctly separated from each other to prevent cross contamination. Dipping was performed as per previously established methods for making condoms using conventional dipping processes. The films of latex compound coated on the formers were not dried before forming the next coating. The accelerator compound (Formulation A) coating gets an over coating of sulphur compound (Formulation B) when the first coating is still in nearly wet condition and vulcanization was initiated at this stage. Previously the process was to dip1-dry1 then dip2 and dry2. But in this it is to dip1-dip 2 and then dry/vulcanise.

The rest of the process is similar to that of example 1.

Example 3

Using Synthetic Latex

Different Dipping Method

Step A: Preparation of Dispersions and Solutions and Step B: Compounding of Synthetic Latex will be same as in Example 1
Step C: Condom Dipping Process In this example the Dipping was carried out using the above compounds independently, the Formulation A in the first dipper, Formulation B in the second dipper and again Formulation A in the third dipper. The dippers were distinctly separated from each other to prevent cross contamination. Dipping was performed as per previously established methods for making condoms using conventional dipping processes. The films of latex compound coated on the formers were dried by means of electrical heaters set to achieve film temperatures of 60° C. to 120° C.

The accelerator compound (Formulation A) coating had an over coating of sulphur compound (Formulation B) and vulcanization was initiated at this stage. The dried film was coated in Formulation A again to build a sandwich of sulphur compound inside.

The condoms were collected in wet slurry for further processing.

The rest of the process is similar to example 1.

Example 4

Using Synthetic Latex

Different Dipping Method

Step A: Preparation of Dispersions and Solutions and Step B: Compounding of Synthetic Latex will be same as in Example 1.
Step C: Condom Dipping Process In this example the Dipping was carried out using the above compounds independently, the Formulation A in the first dipper, Formulation B in the second dipper and again Formulation A in the third dipper. The dippers were distinctly separated from each other to prevent cross contamination. Dipping was performed as per previously established methods for making condoms using conventional dipping processes.

The variation is to make the third coating on the second coating without drying the second coating. That is dip1-dry 1-dip 2-dip 3-dry/vulcanise. The advantages were on thickness control on different layers.

The condoms were collected in wet slurry for further processing.

The rest of the process is similar to example 1.

Example 5

Using Natural Rubber Latex

In this example natural rubber latex—derived from *Hevea brasiliensis* is used—as against previous examples wherein synthetic polyisoprene was used.

The concept of the formulations A, B are same as before but the differences would be in the type of surfactants and other ingredients added.

Step A: Preparation of Latex Formulation A

The required quantity of natural rubber latex was transferred into a compounding vessel (designated for "Formulation A") using a designated pump. During transfer the latex was filtered through 40 micron filter.

The latex was stirred using a mechanical stirrer with a speed of rotation within the range of 30 to 60 rpm. The temperature of the compounded latex was maintained within (27±3)° C. throughout this process until the compounded latex was transferred to the Dipping Line.

The quantities of ingredients added to the latex are given in Table 3.

TABLE 3

Quantity of solutions and dispersions of Formulation A

| Primary chemicals | % TSC | Phr |
|---|---|---|
| Natural rubber latex | 58 | 100 |
| Potassium oleate | 10 | 0.3 |
| Emulgin ® B2 | 10 | 0.3 |
| Anilan NC 30 | Not used | |
| Vultamol | 10-30 | 0.05-0.6 |
| KOH | 5 | 0.1 |
| KHWS | 0.01 | NA |
| Ammoniated water | | 0.05-2 |
| Composite paste | 20.15 | 1.2-1.84 |
| 0.01 KHWS solution | Not used | NA |
| Darvan ® SMO/Darvan 1SD | Not used | |
| ZDBC | 100 | 1.59 |
| ZnO | 100 | 0.231 |
| Struktol ® LA 229 | 40 | NA |

The method of additions and stirring are similar to that of synthetic polyisoprene process described before in Example 1.

Step B: Preparation of Latex Formulation B

The required quantity of natural rubber latex was transferred into a compounding vessel (designated for "Formulation B") using a designated pump. During transfer the latex was filtered through 40 micron filter.

The latex was stirred using a mechanical stirrer with a speed of rotation within the range of 30 to 60 rpm. The temperature of the compounded latex was maintained within (27±3)° C. throughout this process until the compounded latex was transferred to the Dipping Line.

The quantities of ingredients added to the latex are given in Table 4.

TABLE 4

Quantity of solutions and dispersions of Formulation B

| Primary chemicals | % TSC | Phr |
|---|---|---|
| Natural rubber latex | 58 | 100 |
| Potassium oleate | 10 | 0.3 |
| Emulgin ® B2 | 10 | 0.3 |
| Anilan NC 30 | Not used | |
| KOH | 5 | 0.1 |
| KHWS | 0.01 | NA |
| Ammoniated water | | 0.05-2 |
| Sulphur paste | 68.07 | 1.64 |
| Sulphur paste-sub-components: | | |
| 0.01% KHWS soln | 0.01 | NA |
| Darvan ® SMO/Darvan ® 1SD | 100 | NA |
| Bentonite clay | 100 | 0-0.01 |
| Sulphur | 100 | 1-1.8 |
| Vultamol | 100 | 0.05-1.8 |
| Anti-oxidant | 100 | 0-1.5 |
| Struktol ® LA 229 | 40 | NA |

The method of additions and stirring are similar to that of synthetic polyisoprene process described before in Example 1.

The two formulations A, B are taken for dipping.

The rest of the Dipping process is similar to the descriptions in Examples 1-4.

Condoms made using the disclosed binary method should be allowed to undergo further maturation in room temperature storage for 4 weeks. The physical properties improve further during this period due to continued curing of the latex film. After maturation the condoms can be tested electronically for defects such as pin-holes etc. and any defectives found segregated and disposed off. Those that are found to be free from manufacturing defects can be packed in foil packing as per customers' requirements.

During experiments features of condoms manufactured by the binary process and conventional process were compared and it was found that both types of condoms have similar swelling index, burst volume and burst pressure.

GLOSSARY OF TERMS AND DEFINITIONS

Physical properties of the finished products are determined by how much of the sulphur has formed cross links within and between the polyisoprene chains or the lattices. For Lattices this process is termed as "vulcanization". The term "pre-vulcanization" is used to refer to the vulcanization taking place at the stage of preparing liquid compound using the lattices. The term "curing" is generally used in place of "vulcanization" in the document.

We claim:

1. A binary process for manufacturing dipped latex product, the said process comprising:
    preparing a first latex mixture Formulation A comprising latex, one or more accelerators, and one or more surfactants but no curing agents;
    preparing a second latex mixture Formulation B comprising latex, one or more curing agents, and one or more surfactants but no curing accelerators;
    dipping one or more formers into the Formulations A and B separately in order to form a plurality of coatings/layers of the Formulations A and B; and
    curing the plurality of coatings/layers on the formers to form the dipped latex products.

2. The binary process as claimed in claim 1, wherein the latex used for preparing the Formulation A is natural latex, synthetic latex or combinations thereof.

3. The binary process as claimed in claim 1, wherein the latex used for preparing the Formulation B is natural latex, synthetic latex or combinations thereof.

4. The binary process as claimed in claim 1, wherein the one or more accelerators are selected from the group consisting of zinc di-butyl dithiocarbamate, zinc dithiocarbamate, sodium dibutylditheiocarbamate, and sodium diethyl dithio carbamate.

5. The binary process as claimed in claim 1, wherein the one or more curing agents are selected from the group consisting of sulphur paste, polymeric sulphur, and sulphur donors.

6. The binary process as claimed in claim 1, wherein the one or more surfactants are selected from the group consisting of dodecyl benzene sulphonate, sodium salt of condensed sulfonated naphthalene, sodium salts of sulfated methyl oleate potassium hydroxide solution, and cetyl stearyl alcohol etherified with 20 mol ethylene oxide solution.

7. The binary process as claimed in claim 1, wherein the formation of the plurality of layers/coatings comprises dipping of one or more formers initially in the Formulation A to a depth sufficient to yield a finished latex product of desired length to form a first layer/coating, drying partially or completely the first layer/coating, then dipping the first layer/coating in the Formulation B to form a second layer/coating, and drying the second layer/coating and then curing.

8. The binary process as claimed in claim 1, wherein the formation of the plurality of layers/coatings comprises dipping of one or more formers initially in the Formulation A to a depth sufficient to yield a finished latex product of desired length to form a first layer/coating, drying completely the first layer/coating, then dipping the first layer/coating in Formulation B to form a second layer/coating, drying partially or completely the second layer/coating, further dipping the second layer/coating in Formulation A to form a third layer/coating, and drying completely the third layer/coating and then curing.

9. The binary process as claimed in claim 1, wherein the pH of the Formulations A and B is adjusted to a range of about 11.5 to 12.5.

10. The binary process as claimed in claim 1, wherein the temperature of latex is maintained within $27 \pm 3°$ C. throughout the process.

11. The binary process as claimed in claim 1, wherein the layers/coatings on the formers are dried in a hot oven maintained within a range of 60° C. to 120° C.

12. The binary process as claimed in claim 1, wherein the dipped latex product is a condom, glove, balloon, catheter, finger cot, surgical tubing, baby bottle nipple or dental dam.

* * * * *